UNITED STATES PATENT OFFICE.

JACOB REESE, OF PITTSBURG, PENNSYLVANIA.

PHOSPHATIC FERTILIZER.

SPECIFICATION forming part of Letters Patent No. 450,254, dated April 14, 1891.

Application filed February 18, 1889. Serial No. 300,294. (No specimens.)

*To all whom it may concern:*

Be it known that I, JACOB REESE, a citizen of the United States, residing in Pittsburg, Pennsylvania, have invented a new and useful Improvement in Potassic Phosphates, of which the following is a full, clear, and exact description.

Heretofore in the manufacture of potassic phosphates the phosphatic material—such as bone or Charleston rock—was admixed with sulphate or carbonate of potash, and then the mixture subjected to furnacing at a high temperature in order to change the insoluble phosphoric acid to the soluble condition.

I have discovered that when the tetrabasic phosphate ($P_2O_5 4CaO$) produced in the manufacture of steel by the basic process is used it may be admixed with sulphate or carbonate of potash or with chloride of potassium and used to advantage as a fertilizer without subjecting it to furnacing at any temperature.

In the practice of my invention I take phosphatic basic slag such as produced in the manufacture of steel by the Reese basic process and subject it to a crushing, grinding, and pulverizing process until it is reduced to a powder, preferably so fine that eighty per cent. (80%) will pass through a sieve having ten thousand holes to the square inch. The potassic material—such as kainit, sulphate of potash, or muriate of potash—is also ground. When the materials are thus prepared they are admixed in any desired proportions and are ready for use.

In crushing, grinding, and pulverizing the phosphatic basic slag care should be taken to separate all particles of metallic iron from the slag, first, because the iron will injure the machinery, and, secondly, because an excess of iron is objectionable in plant-food.

By a mixture of ninety per cent. of basic phosphate with ten per cent. of muriate of potash I produce the following fertilizer:

| | Per cent. |
|---|---|
| Lime | 46.23 |
| Phosphoric acid | 17.71 |
| Muriate of potash | 10.00 |
| Silica | 10.44 |
| Oxide of iron | 9.72 |
| Magnesia | 1.48 |
| Sulphate of calcium | .59 |
| Oxide of manganese | 3.83 |
| | 100.00 |

By mixing fifty per cent. of the basic phosphate with fifty per cent. kainit I form the following fertilizer:

| | Per cent. |
|---|---|
| Lime | 25.68 |
| Phosphoric acid | 9.84 |
| Sulphate of potash | 11.50 |
| Silica | 5.80 |
| Sulphate of magnesia | 7.80 |
| Magnesia | .82 |
| Chloride of magnesium | 6.50 |
| Oxide of manganese | 2.13 |
| Chloride of sodium | 17.40 |
| Sulphide of calcium | .33 |
| Water | 6.80 |
| Oxide of iron | 5.40 |
| | 100.00 |

By mixing the basic slag with potash different proportions of potash and phosphoric acid may be made suitable for the wants of the different crops in which every pound of potash and phosphoric acid is available as plant-food. The material is ground so fine and is so dry that it flows freely through the drill, which is a great advantage over all other fertilizing compounds, which, owing to their moisture, clog the drills and often leave barren spots in the fields.

When potassic phosphate is prepared, as herein described, and applied to the earth, it is the most economic and available plant-food known to me. It is dry, free from sulphuric acid, and in such a chemical state that any particle of it is plant-food.

What I claim as my invention, and desire to secure by Letters Patent, is—

1. A fertilizer composed, essentially, of pulverized calcareous phosphatic basic slag and material containing potash, as set forth.

2. A fertilizer composed, essentially, of pulverized calcareous phosphatic basic slag and materials containing potash which have not been subjected to a furnace-heat after admixture, as set forth.

3. A fertilizer composed, essentially, of pulverized calcareous phosphatic basic slag and pulverized kainit, as set forth.

4. A fertilizer composed of pulverized calcareous phosphatic basic slag and sulphate of potash, as set forth.

JACOB REESE.

Witnesses:
JOHN C. PENNIE,
HERBERT W. ELMORE.